MAGNETIC TAPE RECORDER

Filed Nov. 7, 1958 2 Sheets-Sheet 1

Inventor
L. Namenyi-Katz
By Glascock Downing & Seebold
Attys

Inventor
L. Namenyi-Katz
By Glascock Downing & Seebold
Attys.

United States Patent Office 2,995,287

Patented Aug. 8, 1961

2,995,287

MAGNETIC TAPE RECORDER

Laszlo Namenyi-Katz, London, England, assignor to Epsylon Research and Development Co. Limited, Bedfont, England Filed Nov. 7, 1958, Ser. No. 772,434
Claims priority, application Great Britain Nov. 15, 1957
8 Claims. (Cl. 226—187)

This invention relates to magnetic tape recorders and more especially to an improved drive for the pinch roller of a capstan and pinch roller assembly in such recorders.

It is normal practice in known tape recorders to provide for the transport of the tape by means of a capstan and pinch roller assembly. The capstan is driven at a constant speed and the tape is pressed into frictional contact with the capstan by the pinch roller, which is mounted for free rotation in bearings carried on a swinging arm. In order to engage the tape drive the arm carrying the pinch roller is moved to bring the pinch roller into contact with the tape and to press it into contact with the capstan, a spring usually being provided to maintain a desired pressure. In order to disengage the tape drive the arm carrying the pinch roller is moved away from the capstan, when the tape may be moved in either direction past the capstan by other means.

Tape recorders are now being used for many purposes and it is frequently necessary to run the capstan at high speed to provide a high tape speed, or to provide for very rapid acceleration of the tape or rapid reversal of its direction of movement. When, with the known arrangement, the pinch roller is moved into engagement with the tape, the capstan must not only accelerate the tape, but it must also accelerate the pinch roller from standstill up to the required speed. The inertia of the pinch roller is very much higher than that of the tape so that the rate of acceleration of the tape is largely controlled by the inertia of the pinch roller. The capstan may be slowed down during the acceleration period by the sudden load and skidding may occur between the capstan and tape on the one hand and the tape and pinch roller on the other hand, which may cause undue wear of the tape.

An object of the invention is to provide a capstan and pinch roller assembly in which the pinch roller is continuously driven by the capstan. In this way a rapid acceleration of the tape is assured because the inertia of the pinch roller now assists in accelerating tape.

The pinch roller need only be moved sideways through a small distance in order to disengage the tape drive and the pinch roller may very conveniently be driven by means of a gear on the capstan engaging another gear on the pinch roller, the movement of the pinch roller away from the capstan being so limited that the gears are always in engagement. Accordingly, it is another object of the invention to provide a capstan and pinch roller assembly in which the pinch roller is continuously driven by interengaging gears on the capstan and pinch roller.

Where such a gear drive is employed the movement of the pinch roller away from the capstan allows the pinch roller to fall behind slightly, due to the curvature of the gear teeth; that is to say, the pinch roller continues to run at the same speed but with a slight phase lag compared with the capstan. When the pinch roller is moved back towards the capstan to engage the tape drive this phase lag must be made up. That is to say, there must be a momentary acceleration of the pinch roller, followed by a momentary deceleration, during the movement of the pinch roller. The momentary acceleration of the pinch roller hinders its movement towards the capstan and thus increases the time required to effect engagement of the tape drive. It is a further object of the invention to avoid the momentary acceleration of the pinch roller by the interposition of a friction drive between either the capstan or the pinch roller and the associated gear so that when the pinch roller is moved towards the capstan the friction drive slips by an amount corresponding to the phase lag.

The invention consists of an assembly for a magnetic tape recorder comprising a capstan and a pinch roller adapted for relative movement towards and away from each other, interengaging gears on the capstan and pinch roller, and a friction drive interposed between the capstan or the pinch roller and the respective gear arranged to slip when the interengagement of the gears is altered by relative movement between the capstan and the pinch roller.

The friction drive may include a member made of a material having a very low coefficient of friction and this material may conveniently be nylon or polytetrafluoroethylene. A spring and lock-nuts may be provided to allow of the adjustment of the friction of the friction drive.

The invention will be further described with reference to the accompanying drawings.

Figures 1, 2:
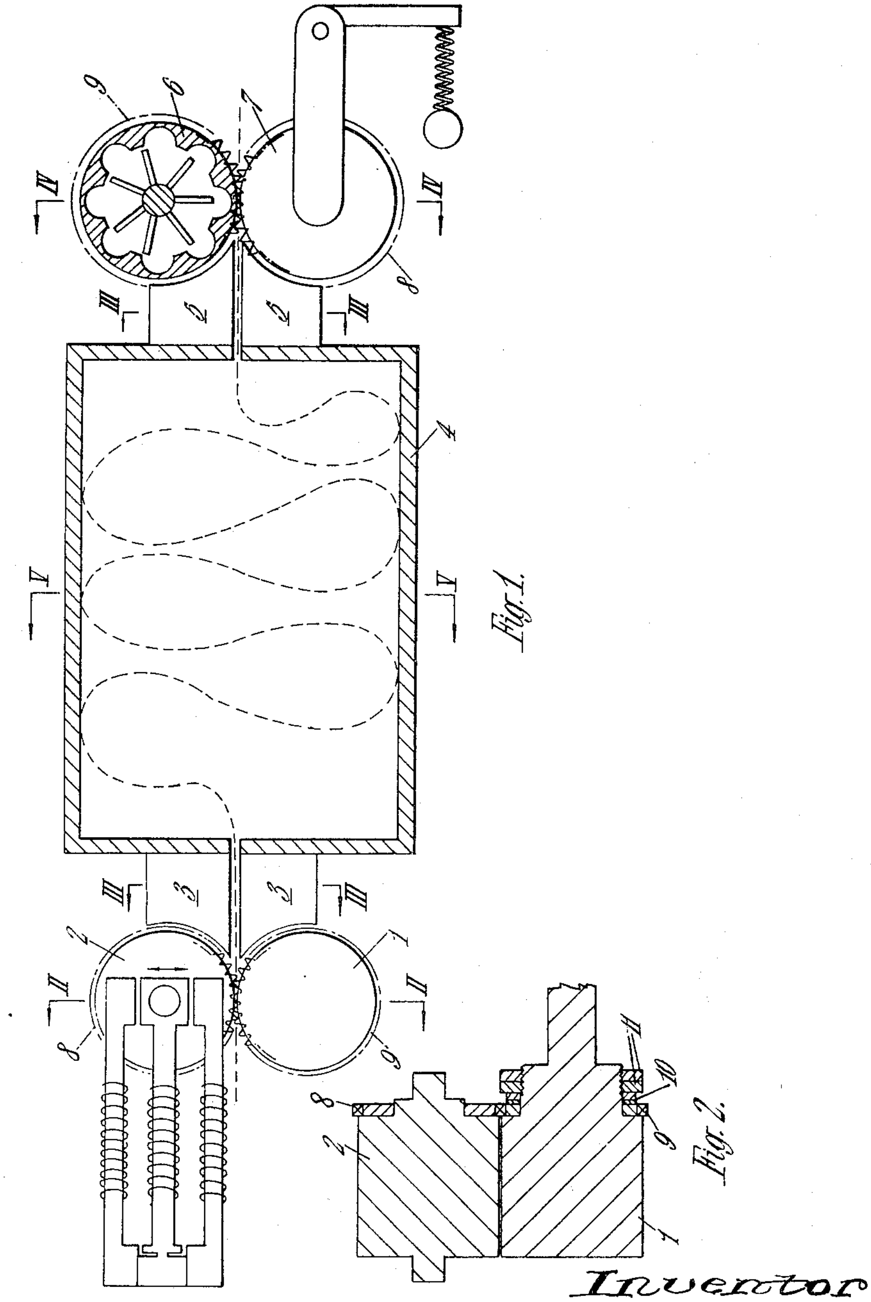
FIGURE 1 is a sectional elevation of part of a magnetic tape recorder in somewhat diagrammatic form.
FIGURE 2 is a section on the line II—II of FIGURE 1.

The tape is engaged between the capstan 1 and the pinch roller 2 (which is of the kind shown in our copending U.S. patent application Ser. No. 701,642, filed December 9, 1957, and fed through a slot between members 3 into tape magazine 4. After passage through magazine 4, the tape emerges through a similar slot between members 5 and passes between auxiliary capstan 6, which has a built-in fluid drive, and pinch roller 7.

Lateral movement of the pinch roller, to enable it to engage and disengage the tape, may be provided for by mounting the pinch roller on a swinging arm, in the conventional manner. Preferably, however, the pinch roller is directly mounted on an electro-magnetic actuator of the kind disclosed in the aforementioned U.S. patent application Ser. No. 701,642. This actuator comprises two spaced stacks of E-shaped laminations, each limb of each stack being provided with a winding. The central limb of each E-shaped lamination is joined to the other two limbs by a narrow neck of metal, so that the central limb is enabled to flex towards either of the other limbs to an extent sufficient to enable the pinch roller to be engaged and disengaged. The movement required is only of the order of 0.003 inch. The pinch roller is carried on a spindle supported in two bearings respectively mounted on the center limbs of the two stacks of laminations. This pinch roller arrangement is characterized by exceptionally rapid operation, which is obtained by passing currents through the windings in such sense that each central limb is simultaneously attracted to one outside limb and repelled by the other, operation in the other direction being secured by reversing the currents either through the center limbs or the outside limbs.

In the complete tape recorder two assemblies of the kind shown in FIGURE 1 are employed, one mounted on each side of a central unit containing the recording and reproducing heads. The tape is driven by friction between it and the capstan and pinch roller and the drive may be disengaged by moving the pinch roller away from the capstan through a small distance, so that the gears are not permitted to disengage.

The method of driving the pinch roller and the auxiliary pinch roller is to provide a gear 9 on each capstan engaging a gear 8 on the respective pinch roller. To avoid a momentary acceleration of the pinch roller when it is moved towards the capstan frictional engagement is provided between the gear 9 and the capstan 1 to enable the gear 9 to slip a little when the gear 8, with the pinch roller, is moved towards it. As is shown in FIGURE 2, the gear 9 is mounted on the capstan so that it may turn and frictional engagement between the gear and the capstan is provided by means of a spring disc 10 and locking rings 11, the latter enabling the pressure of spring disc 10 to be adjusted.

The drive to the pinch roller is very light and the gear 9 is required to slip at a very low additional torque. A light spring is therefore used and a material having a very low coefficient of friction is advantageously used for the friction drive, such as nylon or p.t.f.e. (polytetrafluoroethylene). The gear 9 may itself be made of such low-friction material or the gear may be made of metal and washers of the low-friction material may be provided on either side of it.

It will be evident that the friction drive could be associated with the gear 8 instead of the gear 9.

Figures 3, 4, 5:
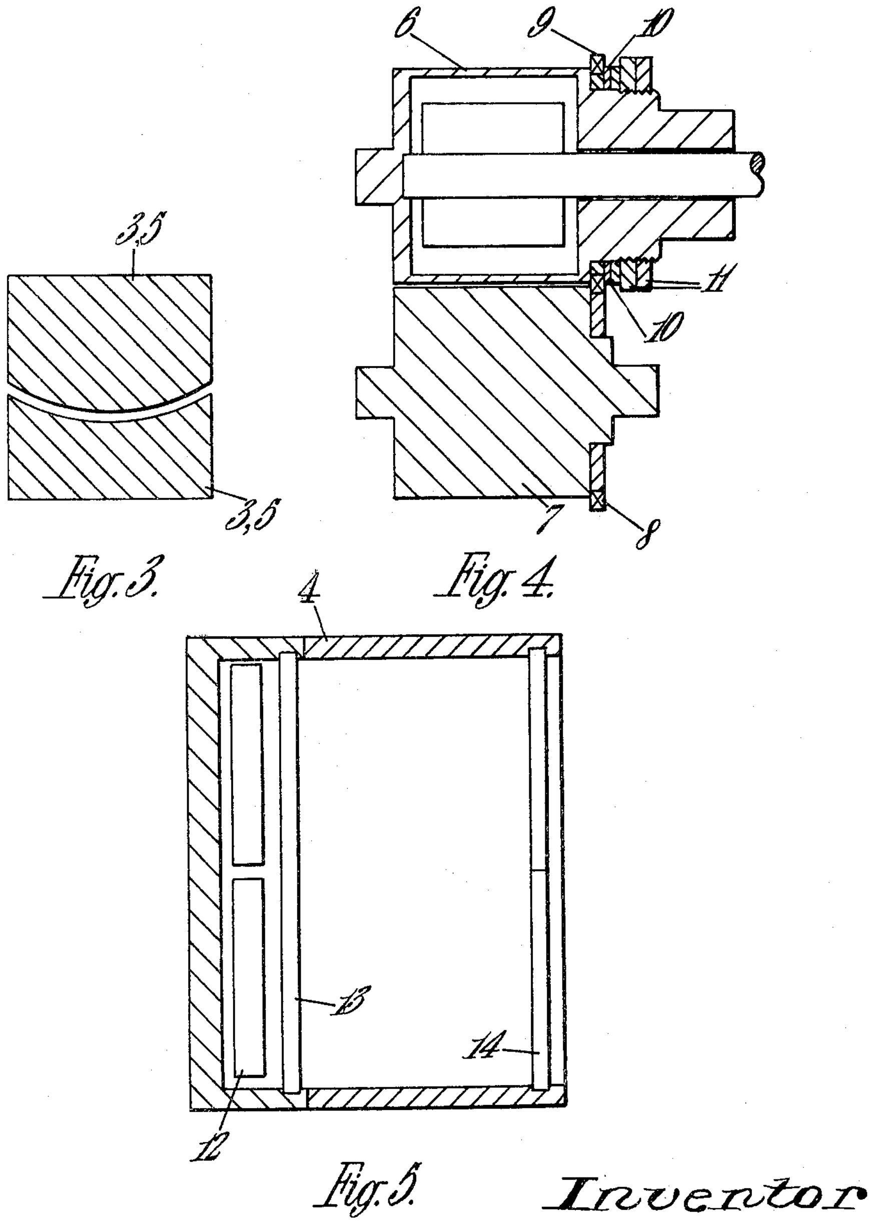
FIGURE 3 is a section on either of the lines III—III of FIGURE 1.
FIGURE 4 is a section on the line IV—IV of FIGURE 1.
FIGURE 5 is a section on the line V—V of FIGURE 1.

In FIGURE 5, which is a cross-section of the magazine 4 of FIGURE 1, 12 represents light sources, 13 a plate provided with openings which may contain lenses and 14 selenium photoelectric cells as described in our co-pending Ser. No. 697,094, now Pat. No. 2,960,611, filed November 18, 1957. The light from the source 12 passes through the magazine at an oblique angle to the line of tape movement through the magazine, so that some of the light is intercepted by the tape, the amount so intercepted depending upon the amount of tape in the magazine. The signals from the photoelectric devices vary with the amount of light falling upon them and this variation is used to control the speed of the motor driving the tape spool so that it feeds or winds up tape at the correct rate. When the two capstans are reversed tape is fed into both ends of one magazine and withdrawn from both ends of the other magazine during the time required to stop and reverse the tape spools, after which the automatic control allows the spools to run at a higher speed than normal until the excess of tape in one magazine has been removed and the deficit in the other magazine has been made up. In this way the capstans are only required to reverse the movement of a short length of tape, whose inertia is minute.

Various modifications may be made within the scope of the invention.

I claim:

1. In a magnetic tape recorder, an assembly comprising a capstan adapted to be positively driven at a precisely controlled speed, a pinch roller mounted for limited lateral movement into and out of tape driving engagement with said capstan, interengaging gears on said capstan and said pinch roller by which said pinch roller is continuously driven from said capstan, and a friction drive interposed between one of said gears and the member on which it is carried, whereby said friction drive is able to slip during movement of said pinch roller into tape driving engagement with said tape.

2. An assembly as claimed in claim 1 wherein said respective member is said capstan.

3. An assembly as claimed in claim 1 wherein said friction drive includes a member made of a material having a very low coefficient of friction to enable said friction drive to slip at a very low torque.

4. An assembly as claimed in claim 3 wherein said material is polytetrafluoroethylene.

5. In a magnetic tape recorder, an assembly comprising a capstan adapted to be positively driven at a precisely controlled speed, a pinch roller mounted for limited lateral movement into and out of tape driving engagement with said capstan, interengaging gears on said capstan and said pinch roller by which said pinch roller is continuously driven from said capstan, a friction drive interposed between one of said gears and the member on which it is carried, said one of said gears being made of a material having a very low coefficient of friction and forming part of said friction drive, resilient means to control the friction of said friction drive, and adjusting means to adjust the pressure of said resilient means.

6. A tape recorder comprising a magnetic tape, a capstan positively driven at a controlled speed for transporting said tape, a pinch roller adapted for limited movement towards and away from said capstan to press said tape into engagement with said capstan and to release said tape, a gear rotatably mounted on said capstan, spring means pressing said gear into frictional engagement with said capstan, lock nuts to adjust the pressure of said spring means, and a gear fixed to said pinch roller engaged by said gear on said capstan, whereby said pinch roller is continuously driven by said capstan and said gear on said capstan is enabled to slip momentarily when said pinch roller is moved towards said capstan to engage said tape.

7. A tape recorder as claimed in claim 6 wherein said gear on said capstan is made from a material having a very low coefficient of friction.

8. A tape recorder as claimed in claim 6 wherein said gear on said capstan is made from polytetrafluoroethylene.

References Cited in the file of this patent

UNITED STATES PATENTS

| | | |
|---|---|---|
| 1,718,225 | Funk | Jan. 25, 1929 |
| 2,373,107 | Duffy | Apr. 10, 1945 |
| 2,838,250 | Stavrakis et al. | June 10, 1958 |
| 2,851,676 | Woodcock et al. | Sept. 9, 1958 |
| 2,857,777 | Porter | Oct. 28, 1958 |